United States Patent
Lee et al.

(10) Patent No.: US 10,218,528 B2
(45) Date of Patent: Feb. 26, 2019

(54) FREQUENCY SCANNING TO FORM A COMMUNICATION NETWORK

(75) Inventors: Ronald Lee, San Diego, CA (US); Ken Chu, San Diego, CA (US); Robert Lawrence Hare, Jr., San Diego, CA (US); Glenn Delucio, San Diego, CA (US); Zong Liang Wu, San Diego, CA (US)

(73) Assignee: ENTROPIC COMMUNICATIONS, LLC, Carlsbad, CA (US)

( * ) Notice: Subject to any disclaimer, the term of this patent is extended or adjusted under 35 U.S.C. 154(b) by 1425 days.

(21) Appl. No.: 13/099,079

(22) Filed: May 2, 2011

(65) Prior Publication Data

US 2011/0205935 A1 Aug. 25, 2011

Related U.S. Application Data

(63) Continuation of application No. 12/098,982, filed on Apr. 7, 2008, now Pat. No. 7,936,701.

(60) Provisional application No. 60/910,661, filed on Apr. 7, 2007, provisional application No. 60/916,804, filed on May 8, 2007.

(51) Int. Cl.
| | | |
|---|---|---|
| *H04N 21/2365* | (2011.01) | |
| *H04L 12/28* | (2006.01) | |
| *H04W 8/00* | (2009.01) | |
| *H04W 84/20* | (2009.01) | |

(52) U.S. Cl.
CPC ... *H04L 12/2807* (2013.01); *H04N 21/23655* (2013.01); *H04W 8/005* (2013.01); *H04L 2012/2849* (2013.01); *H04W 84/20* (2013.01)

(58) Field of Classification Search
CPC ..... H04W 84/18; H04W 8/005; H04W 16/18; H04W 88/16; H04W 84/20; H04L 61/2092; H04L 63/10; H04Q 11/0478; H04N 21/23655
See application file for complete search history.

(56) References Cited

U.S. PATENT DOCUMENTS

| | | | |
|---|---|---|---|
| 2005/0036505 A1* | 2/2005 | Frei et al. | 370/442 |
| 2005/0086273 A1* | 4/2005 | Loebbert et al. | 707/204 |
| 2006/0239224 A1* | 10/2006 | Borst et al. | 370/329 |
| 2007/0149122 A1* | 6/2007 | Murphy | 455/41.2 |
| 2008/0192713 A1* | 8/2008 | Mighani et al. | 370/338 |

\* cited by examiner

*Primary Examiner* — Salvador E Rivas
(74) *Attorney, Agent, or Firm* — McAndrews, Held & Malloy, Ltd.

(57) ABSTRACT

A node forms a network by scanning for an existing network. If an existing network is not found, the node operates as a network controller node of the first network and admits at least one client node to the first network. As a network controller node, the node designates one of the client nodes as a scout node. The scout node removes itself from the first network and scans for a second network. If the scout node does not return to the first network after a predetermined time, it is assumed that the scout node has found a second network. The network controller node of the first network then designates the remaining client nodes as scout nodes, and then joins the second network as a client node. Therefore, multiple networks are avoided.

15 Claims, 5 Drawing Sheets

FREQUENCY SCANNING TO FORM A COMMUNICATION NETWORK

RELATED APPLICATIONS

This application is a Continuation of and claims the benefit of U.S. Non-Provisional application Ser. No. 12/098,982 filed Apr. 7, 2008, U.S. Pat. No. 7,936,701 issued May 3, 2011; which claims the benefit of U.S. Provisional Application No. 60/910,661, filed Apr. 7, 2007, and the benefit of U.S. Provisional Application No. 60/916,804, filed May 8, 2007, the specifications of which are herein incorporated by reference.

FIELD

This disclosure is directed generally to a communication network, and in particular to forming a communication network using frequency scanning.

BACKGROUND INFORMATION

In some networking environments, communication networks may be formed when multiple interoperable nodes communicating over a shared medium detect the existence of other nodes. One example of such a network is a network that operates in accordance to the Media over Coax Alliance ("MoCA") MAC/PHY Specification v. 1.0. In this network, nodes may function as "clients" or "slave" nodes, or as "master"/"network controller"/"coordinator" ("NC") nodes. A network will typically have a single NC node and any number of client nodes, and the NC node may transmit beacons and other control information to manage the network.

Upon power application or resetting, nodes may scan the available range of possible frequencies to determine where to operate, searching for signals from an NC node. If an NC node signal is found, indicating an existing network, a node may join the existing network. Joining a network involves a node following the protocol specified for network admission. Joining generally involves receiving network information transmitted by the NC node, determining time slots in which to transmit a network admission request, and sending a network admission request, including an identifying message on a designated time slot. The requesting node receives acknowledgement from the NC node for admission to the network.

If an existing network is not found, the node may establish a network at a specific frequency by operating as an NC node and waiting for other nodes to detect its presence and join the network. Where many nodes are nearly simultaneously scanning possible frequencies, it is possible that several nodes will fail to detect the existence of an established network and form a new network. Thus, multiple networks may be formed within the possible frequencies where it is intended or desired that a single network including all nodes is formed, such as within a home environment.

SUMMARY

One embodiment is a node that forms a network by scanning for an existing network. If an existing network is not found, the node operates as a network controller node of the first network and admits at least one client node to the first network. As a network controller node, the node designates one of the client nodes as a scout node. The scout node removes itself from the first network and scans for a second network. If the scout node does not return to the first network after a predetermined time, it is assumed that the scout node has found a second network. The network controller node of the first network then designates the remaining client nodes as scout nodes, and then joins the second network as a client node. Therefore, multiple networks are avoided.

DETAILED DESCRIPTION

One embodiment is an NC node that forms a network at one frequency and then takes actions to determine if another network was also formed at a different frequency. If a second network is found, the NC node migrates its network to the second network and ultimately joins the second network as a network node. Therefore, multiple networks are avoided.

Figure 1:
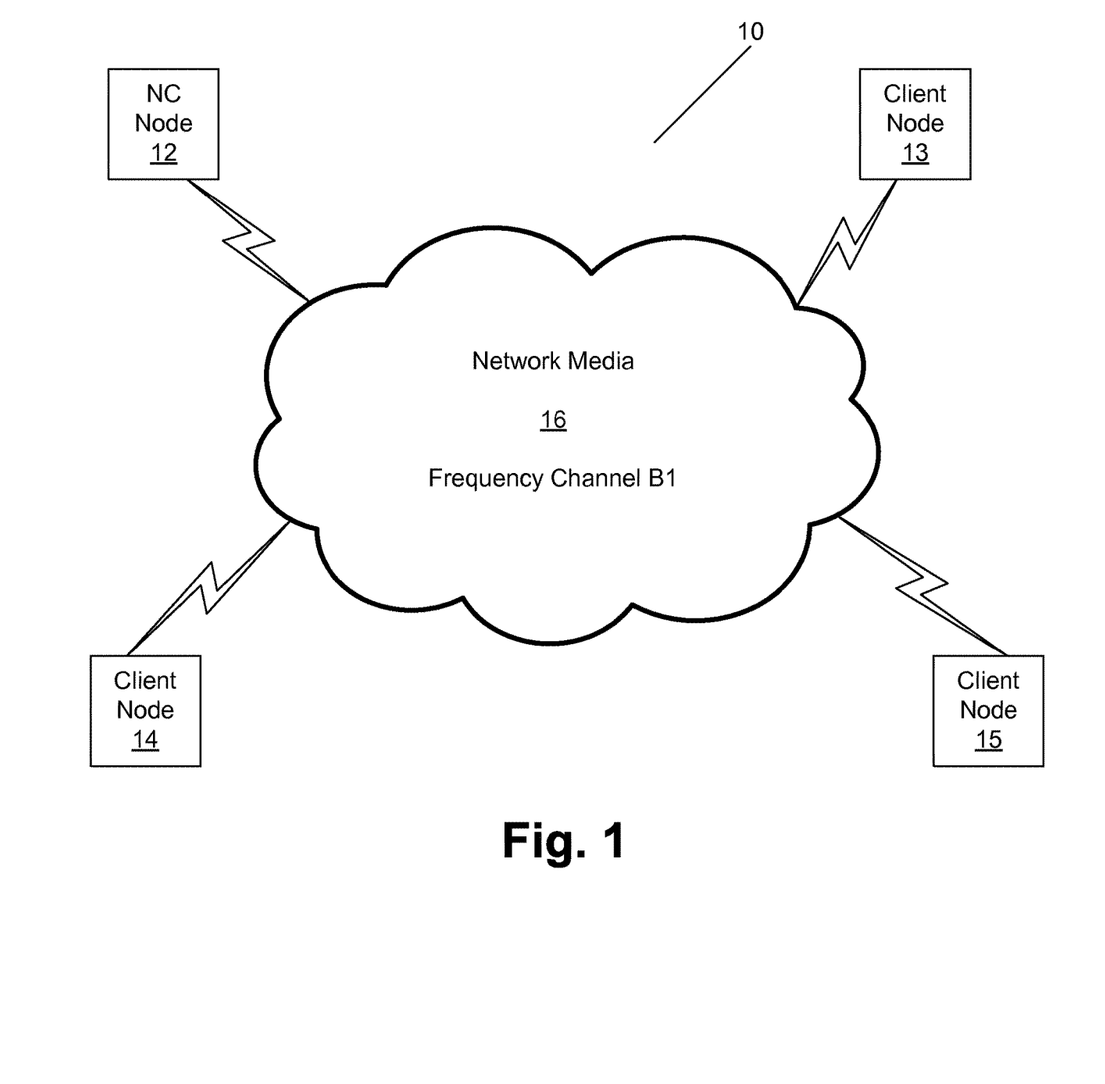
FIG. 1 is a block diagram of a network in accordance with one embodiment.

FIG. 1 is a block diagram of a network 10 in accordance with one embodiment. Network 10 includes an NC node 12 and client nodes 13-15. In one embodiment, network 10 is a network in a home environment, and nodes 12-15 are integrated with or coupled to devices in a home that communicate digital data between each other. Examples of such devices include set-top boxes, digital video recorders ("DVR"s), computers, televisions, routers, etc. Nodes 12-15 are coupled to a network media 16 that provides the media over which the digital data is transferred. In one embodiment, network media 16 is coaxial cable. However, network media 16 may be any other type of media, including other wired media or wireless media. In one embodiment, network 10 is a full mesh network so that any node on the network can communicate directly with any of the other nodes on the network in any direction.

In one embodiment, network 10 is formed by a node that scans a list of frequency channels to search for an existing network. If an existing network is found, the node will join that network as a client node. If no existing networks are found, the node will start a new network, such as network 10, as an NC node, and client nodes will join the new network. In one embodiment, network 10 operates as a network within the allowable frequencies of Media over Coax Alliance MAC/PHY Specification v. 1.0 (hereinafter, "MoCA 1.0"). The range of frequencies in MoCA 1.0 is 875-1500 MHz, and frequency channels exists at intervals of either 25 MHz or 50 MHz. Therefore, there is a frequency channel having a center frequency at 875 MHz, another at 900 MHz, another at 925 MHz, and so on through 1000 MHz, and then skipping to 1150 MHz with channels at 50 MHz intervals from there up to 1500 MHz with a channel centered at 1150 MHz, 1200 MHz, etc., up to 1500 MHz. In the example of FIG. 1, network 10 operates at frequency channel B1 (e.g., 900 MHz), while another network having an NC node and multiple client nodes may operate at frequency channel D2 (e.g., 1200 MHz).

In one embodiment, when network 10 is initially formed or when new client nodes are admitted, a link maintenance operation ("LMO") is performed from each node to every other node of the network. The LMO is controlled by the NC node, which specifies which node is to perform the LMO. An LMO in general involves transmitting probe messages formed using a predetermined bit sequence and length from one node to another node to estimate the channel characteristics between the nodes. The receiving node processes the probe messages as received and determines the impairment present between the transmitter and receiver. Based on the measured impairment of the channel, the modulation between transmitter and receiver is adapted. In one embodiment, bitloading is used to adapt the modulation. Bitloading is a method of allocating a higher order signal constellation to carriers that have higher signal-to-noise ratio and a lower order constellation to carriers that have lower signal-to-noise ratio. In one embodiment, a greatest common denominator ("GCD") modulation profile for the network may then be calculated based on the individual point-to-point LMO results and in another embodiment, GCD probes may be sent to determine the GCD modulation profile.

In one embodiment, network 10 transmits digital data between nodes using Orthogonal frequency-division multiplexing ("OFDM") modulation. In this embodiment, digital data communicated over the link is sent on each of 256 carriers modulated to carry information and all carriers are transmitted to the same recipient in parallel on different frequencies. Therefore, network 10 includes 256 carriers, of which 224 are typically used to carry content in one embodiment. Each of the 224 content carrying carriers is modulated using Binary Phase-Shift Keying ("BPSK"), Quadrature Phase-Shift Keying ("QPSK"), or other Quadrature Amplitude Modulation ("QAM") in one embodiment.

Figure 2:
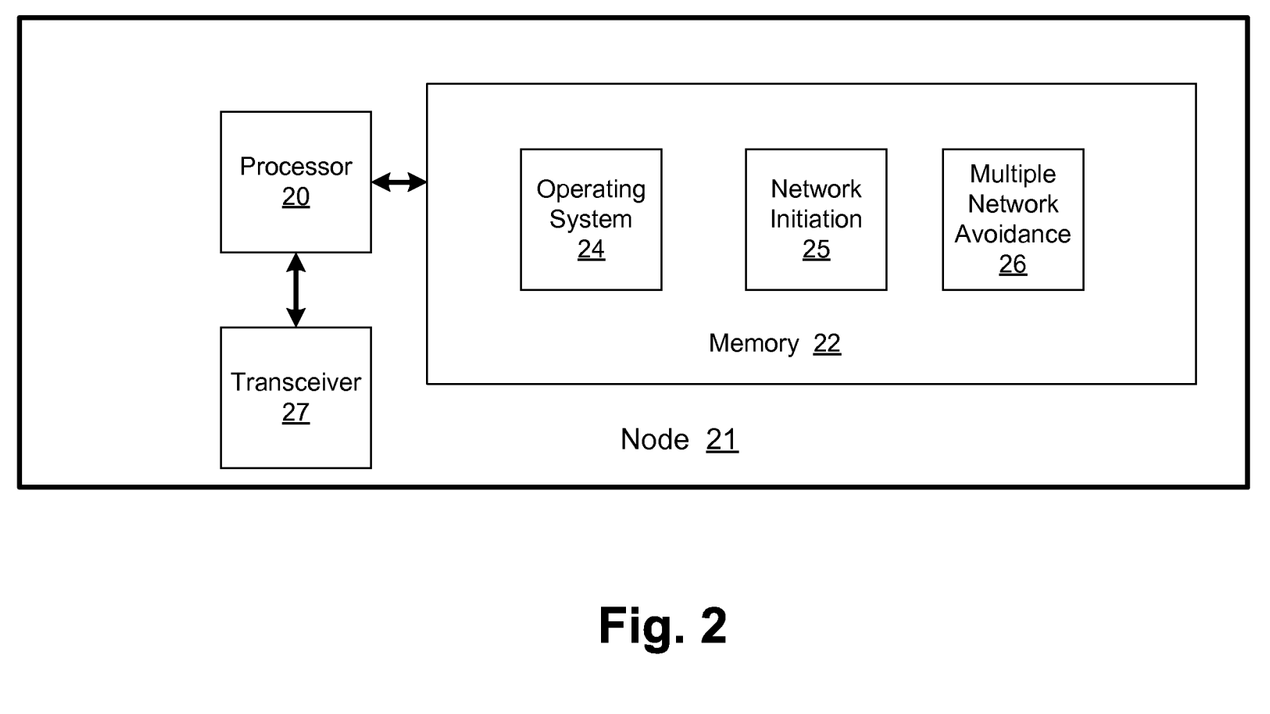
FIG. 2 is a block diagram of a node in accordance with one embodiment.

FIG. 2 is a block diagram of a node 21 in accordance with one embodiment. Node 21 can function as an NC node, such as node 12 of FIG. 1, or as a client node, such as nodes 13-15 of FIG. 1. Node 21 includes a processor 20, a transceiver 27, and memory 22. Processor 20 may be any type of general or specific purpose processor. Transceiver 27 can be any device that transmits and receives digital data. Memory 22 stores information and instructions to be executed by processor 20. Memory 22 can be comprised of any combination of random access memory ("RAM"), read only memory ("ROM"), static storage such as a magnetic or optical disk, or any other type of computer readable medium.

Computer readable medium may be any available media that can be accessed by processor 20 and includes both volatile and nonvolatile media, removable and non-removable media, and communication media. Communication media may include computer readable instructions, data structures, program modules or other data in a modulated data signal such as a carrier wave, or other transport mechanism, and includes any information delivery media.

In one embodiment, memory 22 stores software modules that provide functionality when executed by processor 20. The modules include an operating system 24, a network initiation module 25 and a multiple network avoidance module 26. The functionality of these modules, although shown as software in FIG. 2, can be implemented by any combination of hardware or software in other embodiments.

In one embodiment, operating system 24 provides the functionality that allows processor 20 to operate node 21, including controlling transceiver 27 and memory 22. In one embodiment, network initiation module 25 allows node 21 to either form a network as a NC node, or join an already formed network as a client node. In one embodiment, network initiation module 25 performs its functionality in accordance to MoCA 1.0. In this embodiment, node 21, when it is powered on or otherwise reset, first scans an initial list of frequency channels searching for a beacon. If it finds a beacon at a certain channel, then node 21 will try to be admitted to the network on that channel as a client node. If after scanning all frequency channels in its initial list (i.e., channels 875-1500 MHz) at least once or a predetermined number of times, node 21 cannot find any beacons or cannot get admitted to any network, then node 21 will attempt to form a network as an NC node on a selected frequency channel.

To form a network, node 21 will walk through a second list of frequency channels. At each frequency channel node 21 listens for beacons again. If it hears the beacons of an existing network, it will try to join the network. If beacons are not heard, node 21 will become an NC node and broadcast beacons on the frequency channel as long as the channel is not a taboo channel (i.e., a channel that is to be avoided) as advertised in a beacon of an existing network. The beacon invites other nodes to join the network. In one embodiment, the network uses a time division duplex ("TDD") protocol for communications. In a TDD system, receive and transmit data are communicated during different time intervals, generally using the same frequency band. Different nodes share a common frequency channel through the use of time division multiple access ("TDMA"). In a TDMA system, each node transmits during a different time interval. Nodes are assigned one or more slots of predetermined length in a framing structure that contains multiple slots. All nodes are synchronized by messages such as beacons or Media Access Plans ("MAP"s) that are broadcast by the network NC node. The beacon and MAP messages provide a common time reference to the client nodes and can include other network management information. MAPs are messages sent by the NC to define assignments of nodes to time slots such as described in MoCA 1.0.

A single house or other facility that includes a network, such as network 10 of FIG. 1, may include a large number of nodes. In one embodiment, up to 16 nodes can be part of a single network. However, in the event of a power failure or other incident that causes some or all of these nodes to reset, each node will, as disclosed above, scan for an existing network and then form a new network as an NC node if an existing network is not found. With a large number of nodes, there is a likelihood that multiple independent networks may get formed at different channels or even on the same channel because multiple nodes will not find an existing network. However, it is undesirable for multiple independent networks to exist in a single house or other facility because nodes on separate networks will not be able to exchange data.

Figure 3:
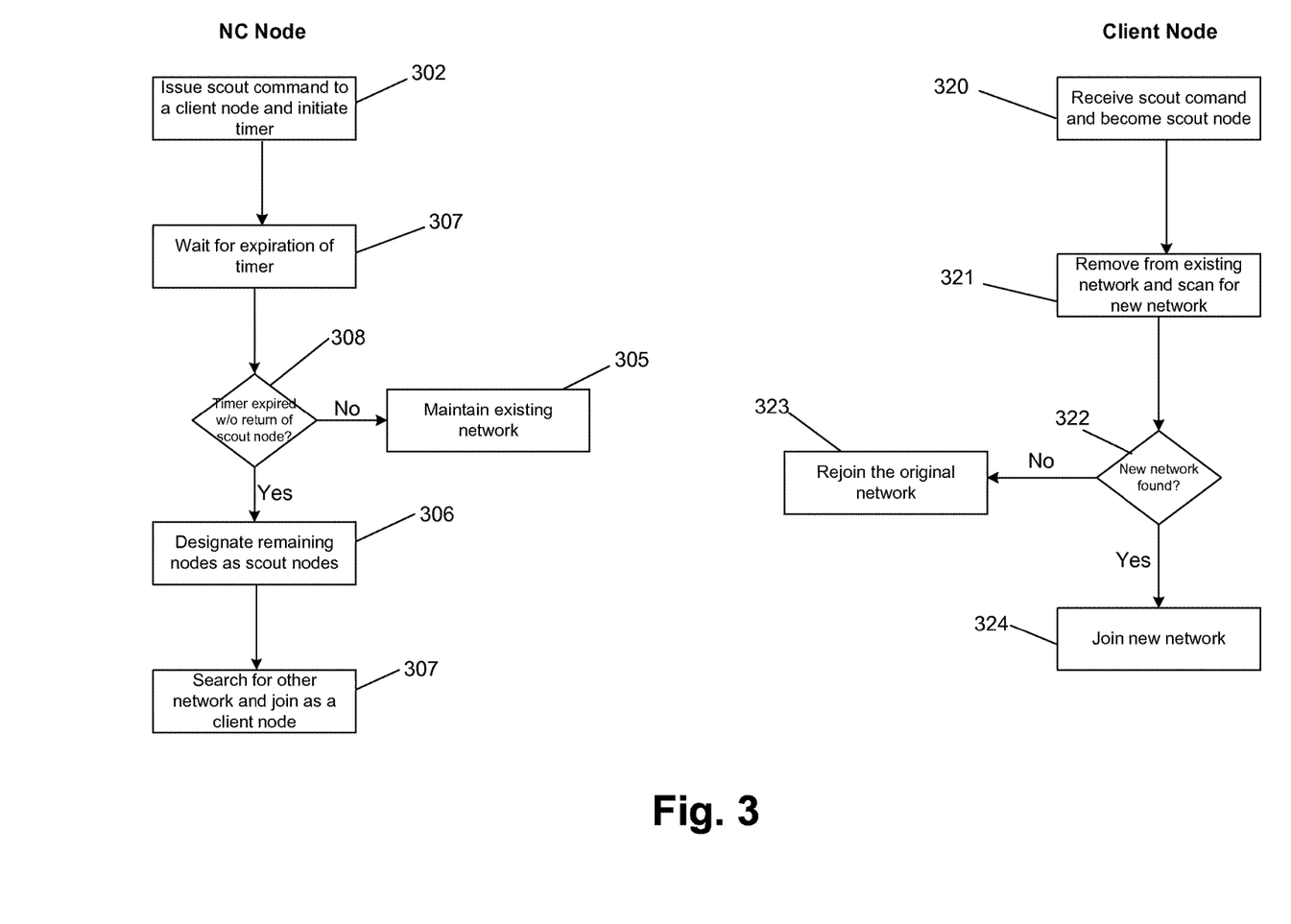
FIG. 3 is a flow diagram of the functionality of the node of FIG. 2 in accordance with one embodiment when initiating a scout node as an NC node or when acting as a client node that becomes a scout node.

Multiple network avoidance module 26 in one embodiment provides functionality that prevents multiple independent networks from forming when its corresponding node (i.e., node 21) is acting as an NC node or a client node. In one embodiment, this functionality includes using a client node as a "scout" node to search for multiple networks. FIG. 3 is a flow diagram of the functionality of node 21 of FIG. 2 in accordance with one embodiment when initiating a scout node as an NC node or when acting as a client node that becomes a scout node. In one embodiment, the functionality of the flow diagram of FIG. 3, and FIG. 4 disclosed below, is implemented by software stored in memory or other computer readable or tangible medium, and executed by a processor. In other embodiments, the functionality can be performed by hardware, or any combination of hardware and software.

At 302, a network such as network 10 has formed at a frequency channel A1, D2, etc. After the network has formed, and when acting as an NC node, node 21 issues a scout command to one of the client nodes that instructs that client node become a scout node. The NC node also initiates a scout return timer that expires after a predetermined time. In one embodiment, a network only initiates scout nodes upon initially forming a new network. In one embodiment, if a new node joins the network while the NC node is waiting for a scout node to return, the scout return timer is reset because the new node may interfere with the scout node rejoining and delay its return.

If node 21 is a client node, then at 320 node 21 receives the scout command and becomes a scout node.

At 321, node 21 as a scout node removes itself from the existing network and scans for frequency channels in one direction for a duplicate network. The direction may be increasing (e.g., channel 1150 MHz, then channel 1200 MHz, then channel 1250 MHz, etc.) and then when the highest channel is reached (i.e., 1500 MHz in one embodiment) reversing direction (i.e., decreasing direction). In another embodiment, the direction can begin by decreasing the channels. All nodes that are scout nodes should scan in the same initial direction (either up or down) so that two different scouts from two different networks do not scan in opposite directions and join each other's original network. Even if two different scouts end up joining two different networks at some point when searching for duplicate networks, the scouts should eventually converge onto the same network by repeating the searching procedure.

At 322, it is determined if a new network has been found during the scanning process. A new network will be found if the scout node detects a beacon at a frequency other than the frequency of its original network and then is captured by the NC node of the new network. The result of joining a new network is what determines that a new network is found in one embodiment.

At 324, if a new network has been found, the scout node has joined the new network as a client node.

At 323, if a new network is not found, the scout node will rejoin the original network as a client node. A new network is not found if the scout node has scanned in one direction to the end (i.e., the highest or lowest frequency channel), reversed direction, and scanned back to the original network channel.

Meanwhile, at 307 the NC node waits for the expiration of the scout timer before the return of the scout node.

At 308, it is determined if the scout timer has expired without the return of the scout node.

At 305, if the scout node has returned before the timer has expired, then the NC node maintains the existing network because the scout node has not found a duplicate network. In one embodiment, if the scout node returns, the NC node never sends out another scout node.

At 306, if the scout node has not returned before the timer has expired, the NC node will assume that a duplicate network exists and the scout node has joined that network. The NC node then sends the remaining client nodes out as scout nodes one at a time, which will cause them to join the other network. In one embodiment, the time between sending out scouts is spaced out to decrease the chance of them trying to join the duplicate network at the same time.

At 307, after all client nodes have left the network as scout nodes, the NC node itself will search for the duplicate network and ultimately join that network as a client node.

In one embodiment, one (or more) of the nodes in one location, such as a house, can be designated as a "preferred" NC node. The preferred NC node will have priority over other nodes not so designated to assure that the preferred NC node assumes the function of the NC node. A node may be selected as the preferred NC node based on factors such as a preferred physical location of the node in the network to optimize communication with other nodes, the capabilities of the node, its stability, latency, its connection to other devices outside the network, etc. The node that is designated as the preferred node may be the node that is least likely to be powered down. For example, in some network embodiments, an optical network terminal ("ONT") node may be located outside of the house and may be on a different source of power as the rest of the house.

If a node is configured as a preferred NC node, it will signal its designation to the network during its admission to the network. In one embodiment, each node includes capabilities bits that are transmitted to the NC node when joining a network. In this embodiment, the capabilities bits of the preferred NC node indicates that it is a preferred NC node.

Figure 4:
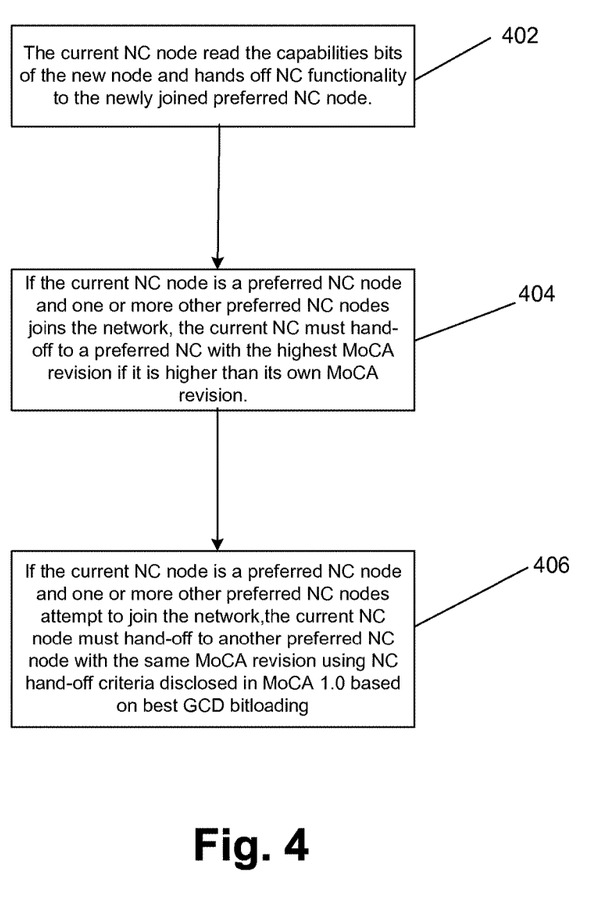
FIG. 4 is a flow diagram of the functionality of the node of FIG. 2 in accordance with one embodiment when acting as an NC node on a network when a preferred NC node attempts to be admitted to that network.

FIG. 4 is a flow diagram of the functionality of node 21 of FIG. 2 in accordance with one embodiment when acting as an NC node on a network when a preferred NC node attempts to be admitted to that network.

At 402, the current NC node (if it is not a preferred NC node) reads the capabilities bits of the new node and hands off NC functionality to the newly joined preferred NC node. In one embodiment, hand-off only occurs after the preferred NC node has had an opportunity to bitload (e.g., perform LMO) with all existing nodes in the network.

In an embodiment where the network operates in accordance with a MoCA standard, at 404 if the current NC node is a preferred NC node and one or more other preferred NC nodes joins the network, the current NC must hand-off to a preferred NC with the highest MoCA revision if it is higher than its own MoCA revision. If there are more than one preferred NC nodes with the highest MoCA revision, the current NC node must hand-off to the one with the best GCD bit loading at the time. The preferred NC node with the best GCD bit loading is the one with the highest GCD bitrate. In one embodiment, hand-off should only occur after the node being handed-off to has had an opportunity to bitload (e.g., perform LMO) with all existing nodes in the network.

In an embodiment where the network operates in accordance with a MoCA standard, at 406 if the current NC node is a preferred NC node and one or more other preferred NC nodes attempt to join the network with the same MoCA revision as its own and there are no preferred NC nodes with higher MoCA revisions, the current NC node must hand-off to another preferred NC node with the same MoCA revision using NC hand-off criteria disclosed in MoCA 1.0 based on best GCD bitloading with hysteresis. In one embodiment, hand-off will only occur after the node being handed-off to has had an opportunity to bitload with all existing nodes in the network.

When multiple nodes are sending a beacon at approximately the same time in an attempt to initiate networks as an NC node, multiple networks can be formed, as discussed above. In prior art network formation, such as network formation in accordance with MoCA 1.0, a node will transmit a beacon and then wait for responses from client nodes. In contrast, in one embodiment of the disclosed method and apparatus, a node such as node 21 will incorporate a listening period between sending out beacons. During the listening period, the node will listen for beacons from other NC nodes, and join that network if a beacon is detected.

Figure 5:
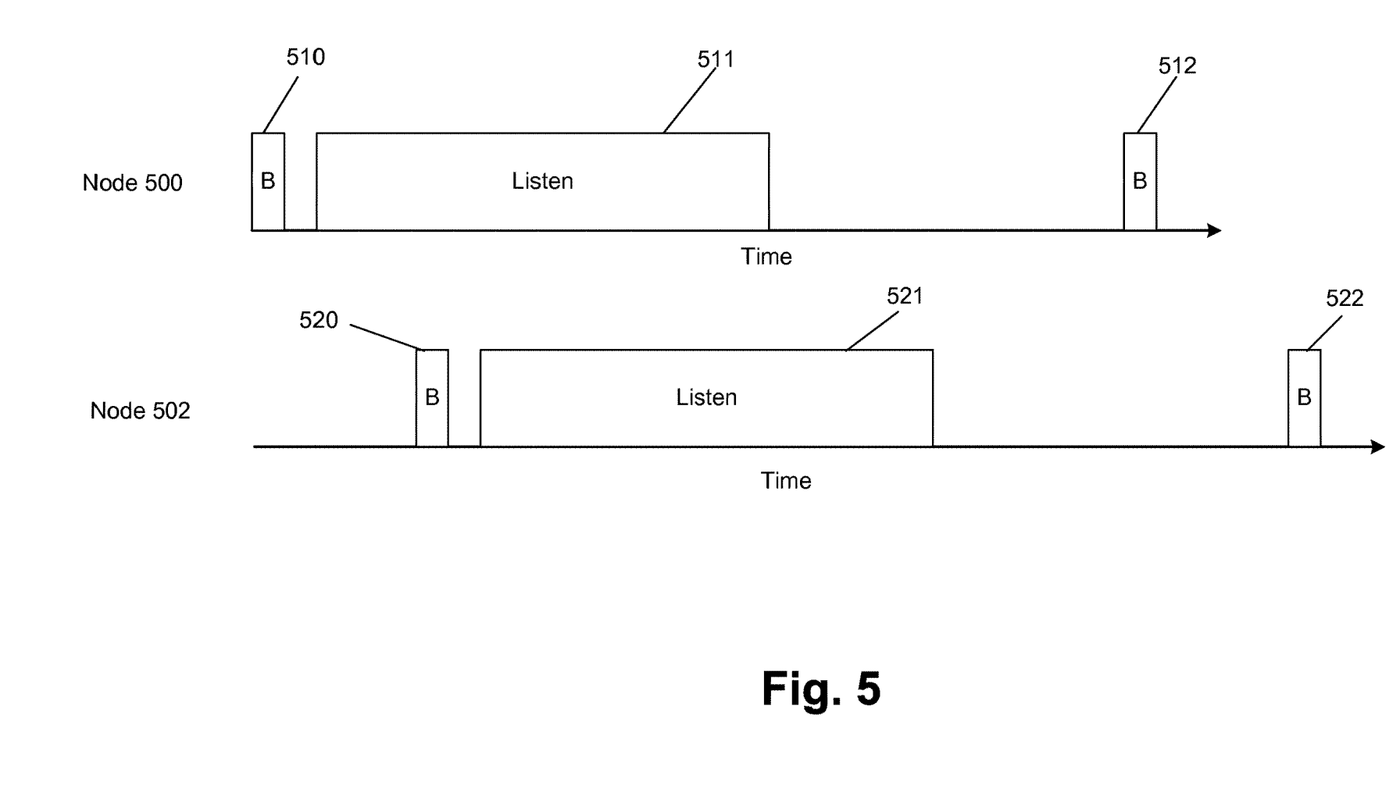
FIG. 5 is a block diagram illustrating the timelines of two nodes in accordance with embodiments of the disclosed method and apparatus.

FIG. 5 is a block diagram illustrating the timelines of two nodes 500, 502 in accordance with embodiments of the disclosed method and apparatus. In the example of FIG. 5, node 500 sends out a beacon at 510 and then listens for beacons during listen period 511, and then sends another beacon at 512. Meanwhile, node 502 sends out a beacon at 520 and then listens for beacons during listen period 521, and then sends another beacon at 522. In one embodiment, the node will listen for a beacon on the same frequency channel as the channel of the beacon that is sent. This prevents two or more networks from forming on the same channel. Further, the period of listening in one embodiment is much longer than the period that the beacon is sent in order to increase the probability that another node's beacon will be heard during the listening period. In one embodiment, only one of nodes 500 or 502 will "hear" the beacon of the other node and stop sending its own beacons, thus assuring only one node is sending beacons and only one network can be formed because there is only one NC node.

As disclosed, embodiments form a network having an NC and one or more client nodes while preventing multiple or duplicate networks from forming. Embodiments include designating a client node as a scout node and including a listening period between the transmission of beacons. Further, a node may be designated as a preferred NC node when that node has properties that give it priority over other nodes.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of operating a first network controller of a first network comprising:
receiving a request to admit a new preferred network controller, the request comprising a signal transmitted by the new preferred network controller designating itself as the new preferred network controller during an admission process to the first network based upon at least one factor relating to a preferable characteristic over other nodes; wherein:
the preferable characteristic comprises bitrate; and
the new preferred network controller is preselected based on a determination that it has a best greatest common denominator bitrate; and
handing off a network controller functionality to the new preferred network controller.

2. The method of claim 1, wherein the first network controller is a first preferred network controller, and the handing off occurs if the new preferred network controller has a higher Media over Coax Alliance revision than the first preferred network controller.

3. The method of claim 1, wherein the first network controller is a first preferred network controller, and the handing off occurs if the new preferred network controller has a better greatest common denominator.

4. The method of claim 1, wherein the designating of the new preferred network controller occurs after selecting a node to be the new preferred network controller, and before admission to the first network.

5. The method of claim 1, further comprising estimating channel characteristics between existing nodes in the first network by transmitting probe messages between each of the existing nodes before handing off the network controller functionality.

6. The method of claim 5, wherein the estimating of channel characteristics comprises determining an impairment present on a channel between each of the existing nodes.

7. The method of claim 6, further comprising adapting a modulation utilized between each of the existing nodes based on the impairment of the channel.

8. The method of claim 5, further comprising calculating a greatest common denominator modulation profile for the first network based on the estimated channel characteristics.

9. The method of claim 1, further comprising sending greatest common denominator probes to determine a greatest common denominator modulation profile for the first network.

10. A computer program product, embodied on a non-transitory computer readable medium, comprising:
computer code for signaling a designation indicative of preferred network controller status to a network controller node of a network during an attempt to gain admission to the network based upon at least one characteristic making it preferable over other nodes, wherein:
the preferable characteristic comprises bitrate; and
the network controller node being preselected based on a determination that the network controller node has a best greatest common denominator bitrate;
computer code for joining the network; and
computer code for receiving network controller functionality for controlling the network from the network controller node.

11. The computer program product of claim 10, wherein the computer code for signaling the designation comprises computer code for transmitting capabilities bits indicative of the preferred network controller status to the network controller node.

12. The computer program product of claim 10, wherein the preferred network controller status is assigned to a node, before admission to the network.

13. A system, comprising:
a plurality of client nodes;
a network controller node; and
at least one network medium connecting the network controller node and the plurality of client nodes to form a network, wherein:
the network controller node is configured to hand off network controller functionality for the network upon receiving a designation that at least one of the plurality of client nodes is a preferred network controller node;
the preferred network controller node being preselected to be the preferred network controller node before its admission to the network based upon at least one characteristic that makes the preferred network controller preferable over remaining ones of the plurality of client nodes;
the at least one characteristic comprises bitrate; and
the preferred network controller node is preselected based on a determination that the preferred network controller node has a best greatest common denominator bitrate.

14. The system of claim 13, wherein the network controller node is further configured to read capabilities bits of the preferred network controller node upon the preferred network controller node joining the network.

15. The system of claim 13, wherein the network controller node is configured to hand off network controller functionality upon further determining that the preferred network controller node has a higher Media over Coax Alliance revision.

\* \* \* \* \*